United States Patent

Tsuzaki et al.

Patent Number: 5,804,895
Date of Patent: Sep. 8, 1998

[54] MINIATURE MOTOR AND METHOD FOR FIXING MINIATURE MOTOR TO PRINTED CIRCUIT BOARD

[75] Inventors: Toshiaki Tsuzaki; Eiichi Ibata, both of Yonago, Japan

[73] Assignee: Matsushita Electric Industrial Co., Ltd., Osaka-fu, Japan

[21] Appl. No.: 299,076

[22] Filed: Sep. 1, 1994

[30] Foreign Application Priority Data

Sep. 2, 1993 [JP] Japan ................... 5-047842 U

[51] Int. Cl.⁶ ................................................. H02K 11/00
[52] U.S. Cl. ................... 310/40 MM; 310/91; 310/258; 310/DIG. 6; 361/741; 361/809
[58] Field of Search ................... 310/71, 91, 42, 310/89, 40 MM, 258; 340/407.1, 311.1; 361/740, 741, 756, 759, 807, 809, 810

[56] References Cited

U.S. PATENT DOCUMENTS

| | | | |
|---|---|---|---|
| 2,144,910 | 1/1939 | Chruchill | 24/213 |
| 3,191,135 | 6/1965 | Hazelquist | 336/65 |
| 4,159,506 | 6/1979 | Latasiewicz | 361/399 |
| 4,625,134 | 11/1986 | Weaver | 310/83 |
| 4,633,110 | 12/1986 | Genco et al. | 310/71 |
| 4,673,834 | 6/1987 | Wrobel | 310/71 |
| 4,841,100 | 6/1989 | Ignasiak | 174/138 G |
| 4,853,568 | 8/1989 | Fujiwara | 310/68 C |
| 4,931,679 | 6/1990 | Fournier | 310/71 |
| 4,934,041 | 6/1990 | Hoover et al. | 29/596 |
| 5,065,279 | 11/1991 | Lazenby et al. | 361/386 |
| 5,175,459 | 12/1992 | Danial et al. | 310/81 |
| 5,218,254 | 6/1993 | Someya | 310/71 |
| 5,287,028 | 2/1994 | Suzuki et al. | 310/71 |
| 5,343,365 | 8/1994 | Lueneburger | 361/773 |
| 5,373,207 | 12/1994 | Yamaguchi et al. | 310/81 |
| 5,453,746 | 9/1995 | Testa et al. | 361/752 |
| 5,575,546 | 11/1996 | Radloff | 312/183 |
| 5,590,023 | 12/1996 | Hernandez et al. | 361/683 |

FOREIGN PATENT DOCUMENTS 2-2048  1/1990  Japan .

Primary Examiner—Steven L. Stephan
Assistant Examiner—Michael J. Wallace, Jr.
Attorney, Agent, or Firm—Wenderoth, Lind & Ponack, L.L.P.

[57] ABSTRACT

A miniature motor includes a frame which has been solder treated on its surface and which has a closed end and is generally cylindrical-shaped or generally oval-shaped in cross section. The frame includes a projected portion of an outer periphery thereof for insertion into a hole of a printed circuit board. The projecting portion has a notch for holding the printed circuit board therein, wherein the printed circuit board and the projected portion extending through the hole of the printed circuit board are soldered to each other with solder while the printed circuit board is held in the notch of the projected portion.

22 Claims, 6 Drawing Sheets

MINIATURE MOTOR AND METHOD FOR FIXING MINIATURE MOTOR TO PRINTED CIRCUIT BOARD

BACKGROUND OF THE INVENTION

The present invention relates to a miniature motor which is capable of being used as various types of drive sources for AV (Audio Visual) equipment and information equipment, and a method for fixing the miniature motor to a printed circuit board.

In recent years, as typified by information equipment and AV equipment, the price of equipment has been increasingly lowering, giving rise to a demand for reduction in the number of man-hours needed to mount miniature motors adopted.

The conventional miniature motor is described below.

FIG. 11 shows a cross section of a conventional miniature motor and its mounting plate. In FIG. 11, reference numeral 1 denotes a frame, 2 denotes a mounting plate, and 6 denotes a screw that serves for installing the frame 1 on the mounting plate 2.

However, since the motor is mounted on the mounting plate 2 with the screws 6, the above conventional arrangement involves steps of arranging the motor on the mounting plate 2 and tightening the screws 6, while it necessitates the mounting plate 2 as well as the preparation of screw holes 1a in the frame 1. As a result, the conventional arrangement has had the problems of higher unit prices of components and larger numbers of man-hours needed for motor installation.

SUMMARY OF THE INVENTION

An object of the present invention is therefore to provide a miniature motor and a method for fixing the miniature motor to a printed circuit board, wherein the motor is low in unit price and which requires fewer man-hours to install on the equipment.

In accomplishing this and other objects, according to a first aspect of the present invention, there is provided a miniature motor comprising a frame which has been solder treated on its surface and which has a closed end and is generally cylindrical-shaped or generally oval-shaped in its radial cross section (both shapes being generically referred to as generally cylindrical or generally cylindrical-shaped).

The frame includes a projected portion of an outer periphery thereof for insertion into a hole of a printed circuit board, the projecting portion having a notch for holding the printed circuit board therein, wherein the printed circuit board and the projected portion extending through the hole of the printed circuit board are soldered to each other with solder while the printed circuit board is held in the notch of the projected portion.

According to a second aspect of the present invention, there is provided a miniature motor comprising a frame which has a closed end and is generally cylindrical-shaped or oval-shaped in its radial cross section.

The frame includes a projected portion of an outer periphery thereof for insertion through a hole of a printed circuit board, the projected portion extending through the hole is bent so that the printed circuit board is held up by the frame and the projected portion.

According to a third aspect of the present invention, there is provided the miniature motor as described in the first aspect, wherein a projected portion of the outer periphery of the frame is raised from the outer periphery of the frame in an outward radial direction or in an axial direction.

According to a fourth aspect of the present invention, there is provided the miniature motor as described in the second aspect, wherein a projected portion of the outer periphery of the frame is raised from the outer periphery of the frame in an outward radial direction or in an axial direction.

According to a fifth aspect of the present invention, there is provided the miniature motor as described in the second aspect, wherein a power feed terminal for the motor arranged on an open side of the frame projects from an outer peripheral wall of the motor and is inserted into a hole of the printed circuit board.

According to a sixth aspect of the present invention, there is provided a miniature motor comprising a frame which has been solder treated on its surface and which has a closed end and is generally cylindrical-shaped or oval shaped in its radial cross section, wherein a power feed terminal for the motor arranged at a bracket arranged on an open side of the frame projects from an outer peripheral wall of the motor and is inserted into a hole of a printed circuit board, and the outer peripheral wall of the motor and the power feed terminal are each soldered onto the printed circuit board.

According to a seventh aspect of the present invention, there is provided a miniature motor comprising a frame which has been solder treated on its surface and which has a closed end and is generally cylindrical-shaped or oval-shaped in its radial cross section, wherein part of a bracket arranged on an open side of the frame is inserted into a hole of a printed circuit board and an outer peripheral wall of the frame is soldered to the printed circuit board.

According to an eighth aspect of the present invention, there is provided a method for fixing a miniature motor to a printed circuit board, the motor including a frame which has been solder treated on its surface and which has a closed end and is generally cylindrical-shaped or generally oval-shaped in its radial cross section, the frame including a projected portion of an outer periphery thereof for being inserted into a hole of a printed circuit board, the projecting portion having a notch for holding the printed circuit board therein.

The method comprises the steps of:
inserting the projected portion of the frame into and through the hole of the printed circuit board so that the printed circuit board is held in the notch of the projected portion of the frame; and
soldering the printed circuit board and the projected portion extending through the hole of the printed circuit to each other with solder while the printed circuit board is held in the notch of the projected portion.

According to a ninth aspect of the present invention, there is provided a method for fixing a miniature motor to a printed circuit board, the motor including a frame which has a closed end and is generally cylindrical-shaped or oval-shaped in its radial cross section, the frame including a projected portion of an outer periphery thereof for penetrating through a hole of a printed circuit board.

The method comprises the steps of:
inserting the projected portion of the frame into and through the hole of the printed circuit board; and
bending the projected portion so that the printed circuit board is held up by the frame and the projected portion.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
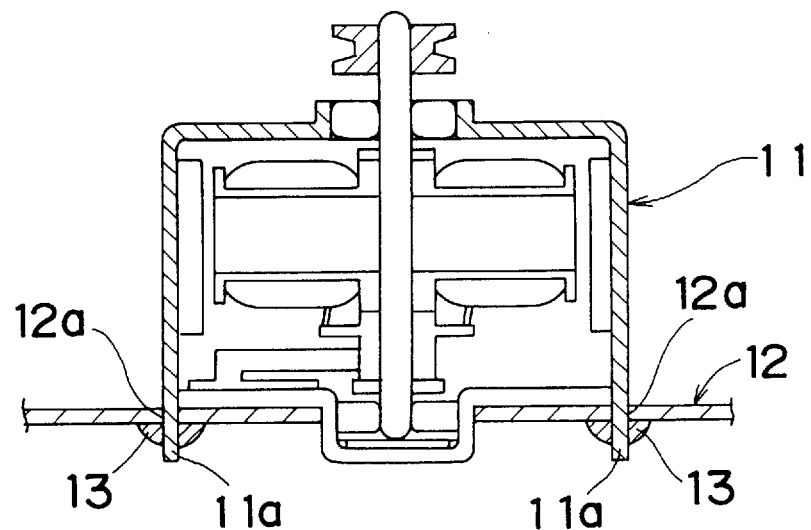
FIG. 1 is a sectional view of a miniature motor fixed to a printed circuit board according to a first embodiment of the present invention.

Before the description of the present invention proceeds, it is to be noted that like parts are designated by like reference numerals throughout the accompanying drawings.

Hereinbelow, a first embodiment of the present invention is described with reference to FIGS. 1 and 2.

Figure 2:
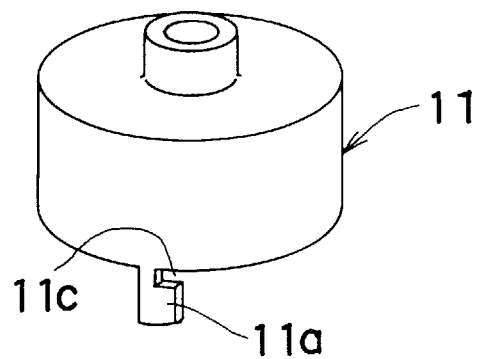
FIG. 2 is a perspective view of a frame of the miniature motor in the first embodiment of the present invention.

Referring to FIGS. 1 and 2, reference numeral 11 denotes a frame which has been solder treated on its surface and which has a closed end and is generally cylindrical-shaped or, in its radial cross section, generally oval-shaped, and 12 denotes a printed circuit board. Reference numeral 11a denotes a projected portion with a notch 11c for holding the printed circuit board 12, which protrudes from an open end of the frame 11 and is inserted into and through a hole 12a provided at a corresponding position of the printed circuit board 12. Denoted by numeral 13 is solder for fixing the projected portion 11a and the printed circuit board 12.

According to the first embodiment, the projected portions 11a of the open end of the frame 11 wherein solder is attached onto the surfaces of the projected portions 11a are inserted through the holes 12a of the printed circuit board 12, and then the printed circuit board 12 is held in the notches 11c of the projected portions 11a. Then, each of the projected portions 11a of the open end of the frame 11, where solder had been previously attached to the surface of each of the projected portions 11a, can be easily fixed with solder 13 to the printed circuit board 12 used in the equipment. Also, a mounting plate and screws, which have conventionally been necessitated, can be omitted. When electronic components are soldered to the printed circuit board 12, the projected portions 11a of the frame 11 can be soldered to the printed circuit board 12 at the same time. Thus, the number of man-hours required for motor installation can be reduced.

Now a second embodiment of the present invention is described with reference to FIGS. 3 and 4.

Figure 3:
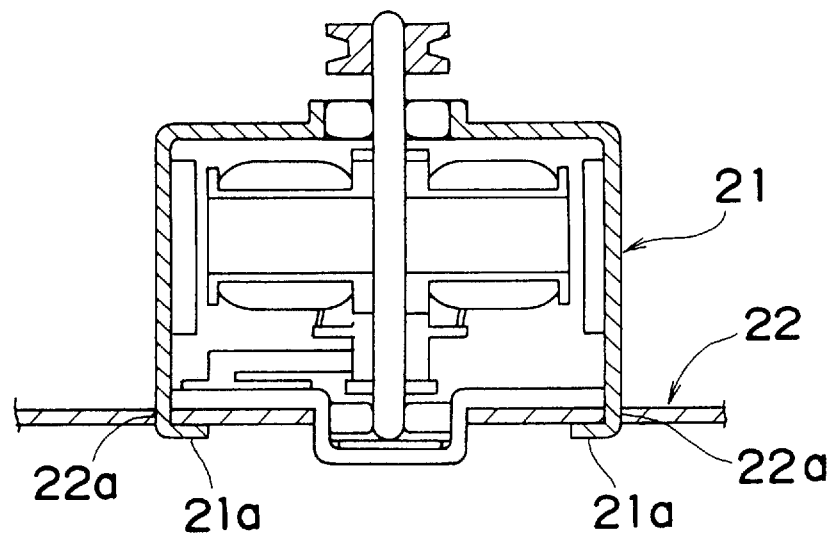
FIG. 3 is a sectional view of a miniature motor fixed to a printed circuit board according to a second embodiment of the present invention.
Figure 4:
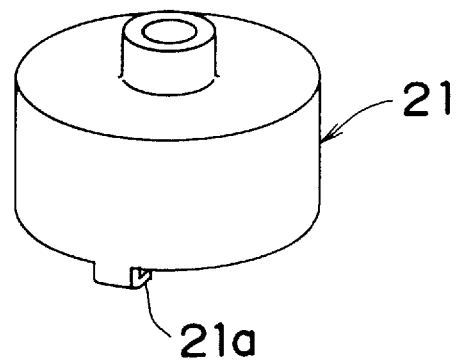
FIG. 4 is a perspective view of a frame of the miniature motor in the second embodiment of the present invention.

Referring to FIGS. 3 and 4, reference numeral 21 denotes a frame which has a closed end and is generally cylindrical-shaped or, in its radial cross section, generally oval-shaped, and 22 denotes a printed circuit board. Reference numeral 21a denotes a projected portion protruding from an open end of the frame 21. Each projected portion 21a extends through each hole provided at a corresponding position of the printed circuit board 22 and is bent toward a motor shaft, thereby holding up the printed circuit board 22. FIG. 4 is a perspective view of the frame 21 alone as the frame 21 is installed on the printed circuit board 22.

According to the second embodiment, the projected portions 21a of the open end of the frame 21 are inserted through holes 22a of the printed circuit board 22 used in the equipment and then the projected portions 21a extending through the holes 22a are bent toward a shaft, whereby the motor can be fixed to the printed circuit board 22. Thus, a mounting plate and screws, which have conventionally been necessitated, can be omitted so that component costs can be reduced.

Now a third embodiment of the present invention is described with reference to FIGS. 5 and 6.

Figure 5:
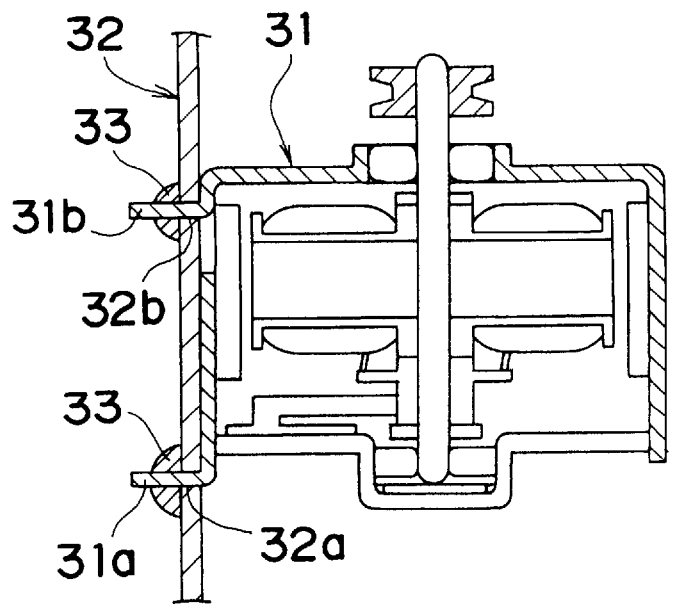
FIG. 5 is a sectional view of a miniature motor fixed to a printed circuit board according to a third embodiment of the present invention.
Figure 6:
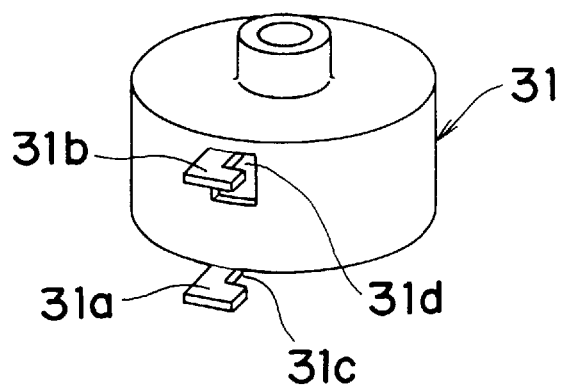
FIG. 6 is a perspective view of a frame of the miniature motor in the third embodiment of the present invention.

Referring to FIGS. 5 and 6, reference numeral 31 denotes a frame which has been solder treated on its surface and which has a closed end and is generally cylindrical-shaped or, in its radial cross section, generally oval-shaped, and 32 denotes a printed circuit board. Reference numeral 31a denotes a first projected portion with a notch 31c for holding the printed circuit board 32, which protrudes from an open end of the frame 31. 31b denotes a second projected portion with a notch 31d for holding the printed circuit board 32, which is raised from the outer peripheral wall of the frame 31 in the outward radial direction. The first and second projected portions 31a and 31b are respectively inserted into holes 32a and 32b provided at a corresponding position of the printed circuit board 32. Denoted by numeral 33 is solder for fixing the printed circuit board 32 and the first and second projected portions 31a and 31b. The second projected portion 31b raised from the outer periphery of the frame 31 may instead be provided on the top surface of the frame 31, in which case the first projected portion 31a is unnecessary.

FIG. 6 is a perspective view of the frame 31 alone, wherein the projected portion 31a protrudes from the open end of the frame 31 and is raised in a radial direction of the frame 31, and the projected portion 31b is raised from the outer peripheral wall of the frame 31 in the radial direction of the frame 31.

The projected portions 31a and 31b of the open end and the outer peripheral wall of the frame 31 wherein solder is attached onto the surfaces of the projected portions 31a and 31b are inserted through the holes 32a and 32b of the printed circuit board 32, and then the printed circuit board 32 is held in the notches 31c and 31d of the projected portions 31a and 31b. Then, the projected portions 31a and 31b can be easily fixed with solder 33 to the printed circuit board 32 used in the equipment.

Now a fourth embodiment of the present invention is described with reference to FIGS. 7 and 8.

Figure 7:
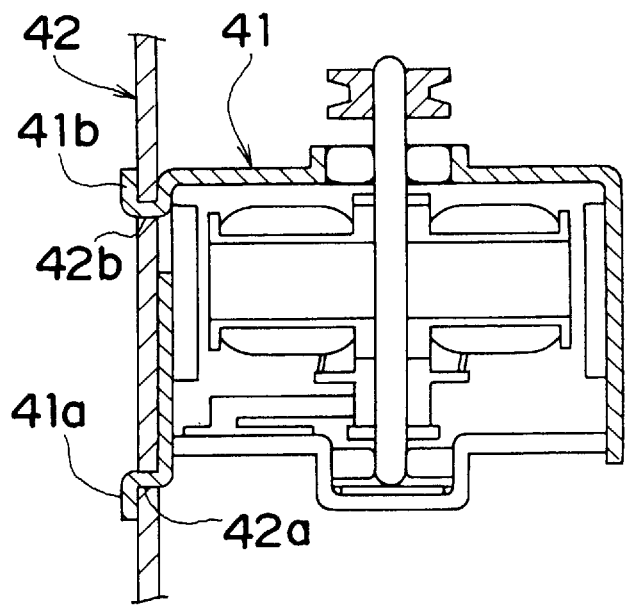
FIG. 7 is a sectional view of a miniature motor fixed to a printed circuit board according to a fourth embodiment of the present invention.
Figure 8:
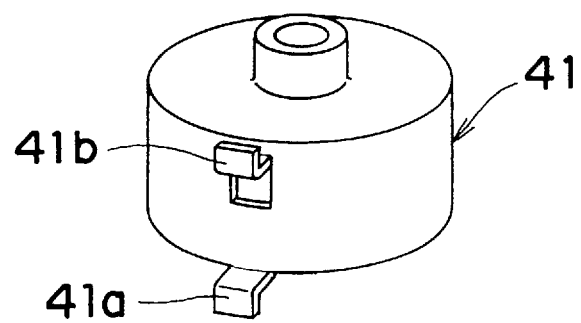
FIG. 8 is a perspective view of a frame of the miniature motor in the fourth embodiment of the present invention.

Referring to FIGS. 7 and 8, reference numeral 41 denotes a frame which has a closed end and is generally cylindrical-shaped or, in its radial cross section, generally oval-shaped, and 42 denotes a printed circuit board. Reference numeral 41a denotes a first projected portion, which protrudes from an open end of the frame 41, and 41b denotes a second projected portion, which is raised from the outer peripheral wall of the frame 41 in the outward radial direction. The first and second projected portions 41a and 41b extend each through holes 42a and 42b provided at corresponding positions of the printed circuit board 42 and are then bent in directions opposite to each other, thereby holding up the printed circuit board 42. That is, the first projected portion 41a protruding from the open end of the frame 41 is raised in the radial direction of the frame 41, and the second projected portion 41b is raised from the outer peripheral wall of the frame 41. The second projected portion 41b raised from the outer peripheral wall of the frame 41 may instead be provided on the top surface of the frame 41, in which case the first projected portion 41a is unnecessary.

FIG. 8 is a perspective view of the frame 41 alone as the frame 41 is installed on the printed circuit board 42.

Now a fifth embodiment of the present invention is described with reference to FIG. 9.

Figure 9:
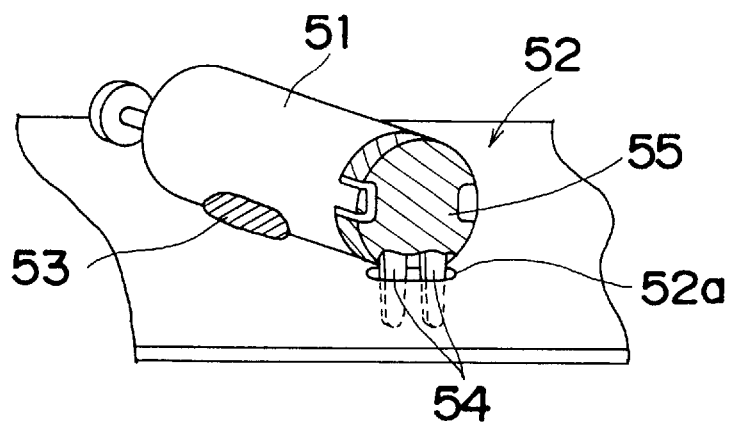
FIG. 9 is a perspective view of a miniature motor fixed to a printed circuit board according to a fifth embodiment of the present invention.

Referring to FIG. 9, reference numeral 51 denotes a frame which has been solder treated on its surface and which has a closed end and is generally cylindrical-shaped or, in its radial cross section, generally oval-shaped, and 52 denotes a printed circuit board. Reference numeral 55 denotes a bracket arranged at an open end of the frame 51, 54 denotes power feed terminals arranged at the bracket 55 and projecting from the outer peripheral wall of the motor, the power feed terminals 54 being inserted into a hole 52a of the printed circuit board 52. Denoted by numeral 53 is solder, which serves to fix the outer peripheral wall of the frame 51 and the printed circuit board 52.

According to the fifth embodiment, since the power feed terminals 54 are inserted into the hole 52a of the printed circuit board 52 and the positioning of the motor is thereby determined, the outer periphery of the frame 51 and the printed circuit board 52 can be fixed directly with solder 53 without providing projected portions of the frame 51.

In addition, in the fifth embodiment, if the frame 51 is not solder treated on its surface, first and second projected portions similar to those of the fourth embodiment may be formed, in which case a hole is provided at a corresponding position of the printed circuit board 52 so that the projected portions are inserted thereinto and the printed circuit board 52 is thereby held up. Thus, the motor can be fixed without soldering.

Now a sixth embodiment of the present invention is described with reference to FIG. 10.

Figure 10:
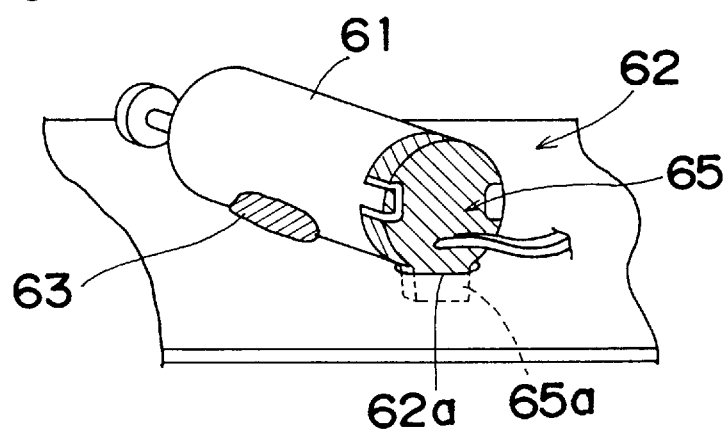
FIG. 10 is a perspective view of a miniature motor fixed to a printed circuit board according to a sixth embodiment of the present invention.
Figure 11:
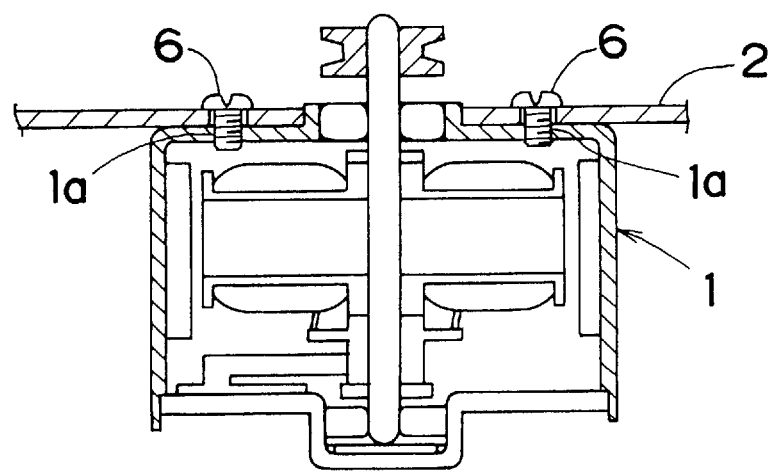
FIG. 11 is a sectional view of a miniature motor fixed to a mounting plate according to the prior art.

Referring to FIG. 10, reference numeral 61 denotes a frame which has been solder treated on its surface and which has a closed end and is generally cylindrical-shaped or, in its radial cross section, generally oval-shaped, and 62 denotes a printed circuit board. Reference numeral 65 denotes a bracket arranged at an open end of the frame 61, which bracket 65 has a protrusion 65a protruding in the outward radial direction, the protrusion 65a being inserted into a hole 62a provided in the printed circuit board 62. Denoted by numeral 63 is solder, which serves to fix the outer peripheral wall of the frame 61 and the printed circuit board 62.

According to the sixth embodiment, since the positioning of the motor is determined by the protrusion 65a of the bracket 65 being inserted into the hole 62a of the printed circuit board 62, the outer periphery of the frame 61 and the printed circuit board 62 can be fixed directly with solder 63 without providing projected portions of the frame 61.

As described above, according to the present invention, the projected portions or outer periphery of the frame is fixed to the printed circuit board with solder or by holding up the printed circuit board with the projected portions of the frame. As a result, an excellent miniature motor can be implemented which no longer involves a mounting plate, screws, and machining of screw holes, which have conventionally been required, and moreover the method for fixing the miniature motor to the printed circuit board can be simplified in the steps and number of man-hours needed to install the motor onto the equipment.

Although the present invention has been fully described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims unless they depart therefrom.

What is claimed is:

1. A miniature motor comprising:
   a stator frame which has been solder treated on its surface and which has a closed end and a generally cylindrical shape;
   a stator fixedly supported by said stator frame;
   a rotor surrounded and rotatable supported by said stator frame in opposition to said stator; and
   wherein said stator frame includes a main frame portion and at least one projected portion extending directly from an outer periphery of said main frame portion for being inserted through at least one hole of a printed circuit board in a first direction from a second surface to a first surface thereof, said printed circuit board being provided outside the motor and extending beyond outer dimensions of said stator frame in at least two opposite directions perpendicular to said first direction, the projected portion having a notch for holding the printed circuit board therein, wherein the printed circuit board and the projected portion extending through the at least one hole of the printed circuit board are soldered to each other with solder and the printed circuit board is held in the notch of the projected portion.

2. A miniature motor comprising:
   a stator frame which has a closed end and a generally cylindrical shape;
   a stator fixedly supported by said stator frame;
   a rotor surrounded and rotatable supported by said stator frame in opposition to said stator; and
   wherein said stator frame includes a main frame portion and at least one projected portion extending directly from an outer periphery of said main frame portion for extending through at least one hole of a printed circuit board in a first direction from a second surface to a first surface thereof, said printed circuit board being provided outside the motor and extending beyond outer dimensions of said stator frame in at least two opposite directions generally perpendicular to said first direction, the projected portion extending through the at least one hole being bent so that the printed circuit board is held between said stator frame and the projected portion.

3. The miniature motor as claimed in claim 1, wherein said at least one projected portion of the outer periphery of said main frame portion is raised from the outer periphery of the main frame portion in an outward radial direction or in an axial direction.

4. The miniature motor as claimed in claim 2, wherein said at least one projected portion of the outer periphery of said main frame portion is raised from the outer periphery of said main frame portion in an outward radial direction or in an axial direction.

5. The miniature motor as claimed in claim 2, wherein said stator frame has an open end, and a power feed terminal for the motor is arranged at the open end of said stator frame and projects from an outer peripheral wall of the motor and is inserted into said at least one hole of the printed circuit board.

6. A miniature motor comprising:
 a stator frame which has been solder treated on its surface and which has a closed end and an open end and is generally cylindrical;
 a stator fixedly supported by said stator frame;
 a rotor surrounded and rotatable supported by said stator frame in opposition to said stator; and
 wherein a bracket is mounted at the open end of said stator frame, and a power feed terminal for the motor extends from the bracket and projects from an outer peripheral wall of the motor and is inserted through a hole of a printed circuit board in a first direction from a second surface to a first surface thereof, said printed circuit board being provided outside the motor and extending beyond outer dimensions of said frame in at least two opposite directions generally perpendicular to said first direction, and the outer peripheral wall of the motor and the power feed terminal are each soldered onto the printed circuit board.

7. A miniature motor comprising:
 a stator frame which has been solder treated on its surface and which has a closed end and an open end and is generally cylindrical;
 a stator fixedly supported by said stator frame;
 a rotor surrounded and rotatably supported by said stator frame in opposition to said stator; and
 wherein a bracket is mounted at said open end of said stator frame and part of the bracket is inserted through a hole of a printed circuit board in a first direction from a second surface to a first surface thereof, said printed circuit board being provided outside the motor and extending beyond outer dimensions of said stator frame in at least two opposite directions generally perpendicular to said first direction, and an outer peripheral wall of said stator frame is soldered to the printed circuit board.

8. A miniature motor for mounting on a printed circuit board having at least one hole therethrough and first and second opposite surfaces, said miniature motor comprising:
 a generally cylindrical stator frame having a closed end;
 a stator fixedly supported by said stator frame;
 a rotor surrounded and rotatably supported by said stator frame in opposition to said stator; and
 wherein said stator frame includes a main frame portion and at least one projected portion projecting directly from an outer periphery of said main frame portion so as to constitute a means for extending through the at least one hole of the printed circuit board beyond the first surface thereof in a first direction while said outer periphery of said main frame portion is positioned adjacent the second surface of the printed circuit board, in such a manner that no portion of said generally cylindrical stator frame which does not extend through the at least one hole of the printed circuit board extends beyond the first surface of the printed circuit board in said first direction.

9. The miniature motor as claimed in claim 8, wherein
 said at least one projected portion has a notch formed therein extending in a generally circumferential direction of said generally cylindrical stator frame for engaging the printed circuit board when said at least one projected portion is inserted through the at least one hole formed through the printed circuit board.

10. The miniature motor as claimed in claim 8, wherein
 said at least one projected portion further constitutes a means for being soldered to the first surface of the printed circuit board.

11. The miniature motor as claimed in claim 8, wherein
 said at least one projected portion is bent so as to include a base portion extending generally in said first direction and a distal portion extending in a second direction generally perpendicular to said first direction, and so as to constitute a means for securing said stator frame to the printed circuit board with the distal portion of said at least one projected portion being disposed on the first surface side of the printed circuit board.

12. The miniature motor as claimed in claim 8, further comprising
 solder for securing said outer periphery of said stator frame directly to the second surface of the printed circuit board.

13. A miniature motor for mounting on a printed circuit board having at least one hole therethrough and first and second opposite surfaces, said miniature motor comprising:
 a generally cylindrical stator frame having a closed end and an open end; and
 a stator fixedly supported by said stator frame;
 a rotor surrounded and rotatable supported by said stator frame in opposition to said stator; and
 a bracket mounted to said open end of said stator frame and including at least one projected portion projecting in a direction away from an outer periphery of said stator frame so as to constitute a means for extending through the at least one hole of the printed circuit board beyond the first surface thereof in a first direction while said outer periphery of said generally cylindrical stator frame is positioned adjacent the second surface of the printed circuit board, in such a manner that no portion of said generally cylindrical stator frame which does not extend through the at least one hole of the printed circuit board extends beyond the first surface of the printed circuit board in said first direction.

14. The miniature motor as claimed in claim 13, further comprising
 solder for securing said outer periphery of said stator frame directly to the second surface of the printed circuit board.

15. The miniature motor as claimed in claim 1, wherein
 no portion of said stator frame which does not extend through the at least one hole of the printed circuit board extends beyond the first surface of the printed circuit board in said first direction.

16. The miniature motor as claimed in claim 2, wherein
 no portion of said stator frame which does not extend through the at least one hole of the printed circuit board extends beyond the first surface of the printed circuit board in said first direction.

17. The miniature motor as claimed in claim 6, wherein
 no portion of said stator frame which does not extend through the at least one hole of the printed circuit board extends beyond the first surface of the printed circuit board in said first direction.

18. The miniature motor as claimed in claim 7, wherein no portion of said stator frame which does not extend through the at least one hole of the printed circuit board extends beyond the first surface of the printed circuit board in said first direction.

19. The miniature motor as claimed in claim 1, wherein said at least one projected portion constitutes a means for positively mounting said motor to the printed circuit board upon insertion of said at least one projected portion through the at least one hole of the printed circuit board and subsequent movement of said motor relative to the printed circuit board to cause engagement of said notch of said at least one projected portion with the printed circuit board, without requiring deformation of said at least one projected portion.

20. The miniature motor as claimed in claim 1, wherein
no casing is interposed between said stator frame and said stator; and
no casing is interposed between said stator frame and said rotor.

21. The miniature motor as claimed in claim 8, wherein said at least one projected portion constitutes a means for positively mounting said motor to the printed circuit board upon insertion of said at least one projected portion through the at least one hole of the printed circuit board and subsequent movement of said motor relative to the printed circuit board to cause engagement of a notch of each of said at least one projected portion with the printed circuit board, without requiring deformation of said at least one projected portion.

22. The miniature motor as claimed in claim 8, wherein
no casing is interposed between said stator frame and said stator; and
no casing is interposed between said stator frame and said rotor.

* * * * *